Sept. 9, 1947.                    W. A. AYRES                    2,426,979
                          STEREOSCOPIC RANGE INDICATION
                            Filed March 9, 1943              2 Sheets-Sheet 1
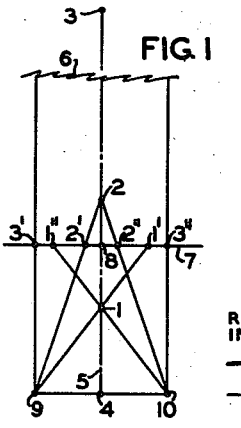
FIG. 3A
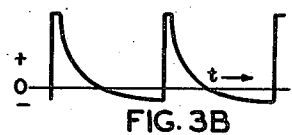
FIG. 3B
FIG. 4
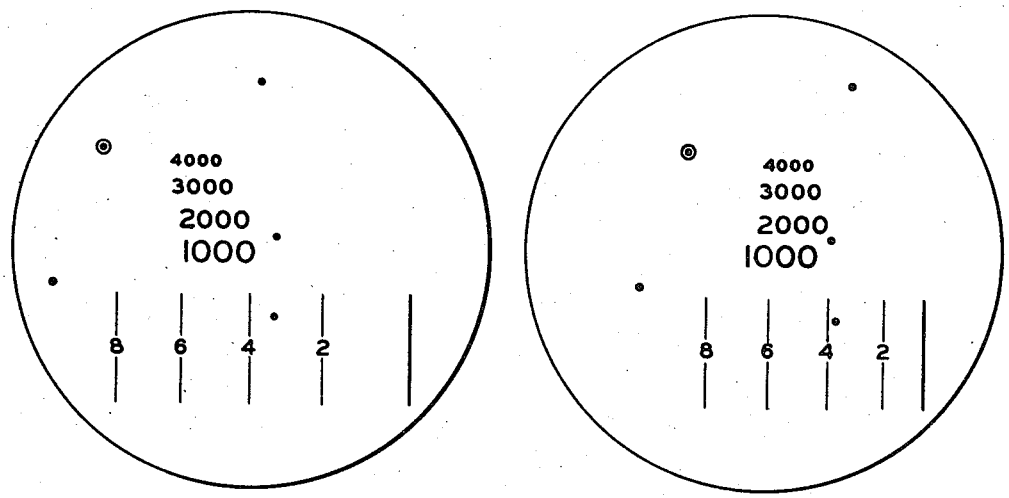
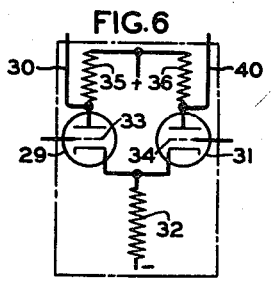
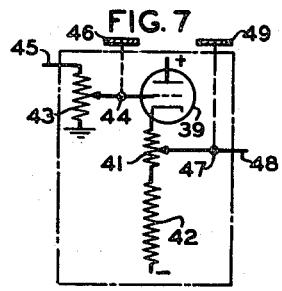
INVENTOR
W. A. AYRES
BY
ATTORNEY Sept. 9, 1947.  W. A. AYRES  2,426,979
STEREOSCOPIC RANGE INDICATION
Filed March 9, 1943  2 Sheets-Sheet 2

INVENTOR
W. A. AYRES
BY
ATTORNEY

Patented Sept. 9, 1947

2,426,979

UNITED STATES PATENT OFFICE 2,426,979

STEREOSCOPIC RANGE INDICATION

Waldemar A. Ayres, Kew Gardens Hills, N. Y., assignor to Sperry Gyroscope Company, Inc., Brooklyn, N. Y., a corporation of New York Application March 9, 1943, Serial No. 478,586

9 Claims. (Cl. 250—1.62)

1

The present invention relates generally to stereoscopic range finders and more particularly, to stereoscopic distance determination in microwave object detecting and locating systems.

Means for producing a three-dimensional picture of remote objects have been disclosed by the present inventor in his copending patent application Serial No. 458,109, titled Synthesized stereoscopic vision, filed September 12, 1942. In that application, the stereoscopic picture is synthesized from the positional data obtainable by a reflected pulse type of microwave object detecting and locating system employing a single electromagnetic energy collector, and is adapted to reveal the positional relationships of a plurality of objects in a realistic and instinctively comprehensible manner.

It is often desirable, however, in such applications as aircraft interception and aircraft gun laying, to have an absolute range scale with which the relative distances of objects may be compared and to be able to determine accurately the range of an individual object without destroying the goniometric indication of the measured object and its positional relationship to other objects.

It is, therefore, the principal object of this invention to provide a stereoscopic range indication for use with microwave object detecting and locating systems which produce a three-dimensional picture of the area scanned.

Another object is to provide an absolute distance scale simultaneously observable in relation to all objects detected in a desired scanning area.

Yet another object lies in the provision of electronic means for stereoscopically determining the accurate range of an individual object while maintaining undisturbed an indication of the relative positions of all objects detected in a desired scanning area.

A further object is to superimpose on a three-dimensional picture of detected objects reproduced by a cathode ray indicator a stereoscopic range scale which may be electronically positioned at will to facilitate depth comparisons.

Other objects and advantages will become apparent from the following specification, taken in connection with the accompanying drawings wherein the invention is embodied in concrete form.

In the drawings:

Fig. 1 is a diagram illustrating the meanings of the terms "goniometric position" and "stereoscopic displacement" as employed in the specification and claims.

Fig. 2 is a graph of the stereoscopic displacement of an image on an indicator screen as a function of the distance from the viewpoint to the corresponding object.

Figs. 3A and 3B are oscillograms of time sweep waves corresponding to the stereoscopic displacements curves of Fig. 2.

Fig. 4 is a stereoscopic drawing which illustrates some of the possible types of range indications and which may be observed in three-dimensional relief by means of an ordinary stereoscope.

Fig. 6 is a schematic wiring diagram of a push-pull output amplifier having two single-ended inputs.

Fig. 7 is a schematic wiring diagram of a gain and direct voltage level control.

Similar characters of reference are used in all of the above figures to indicate corresponding parts. In Fig. 5 arrows are provided to indicate the direction of control or energy flow.

Figure 5:
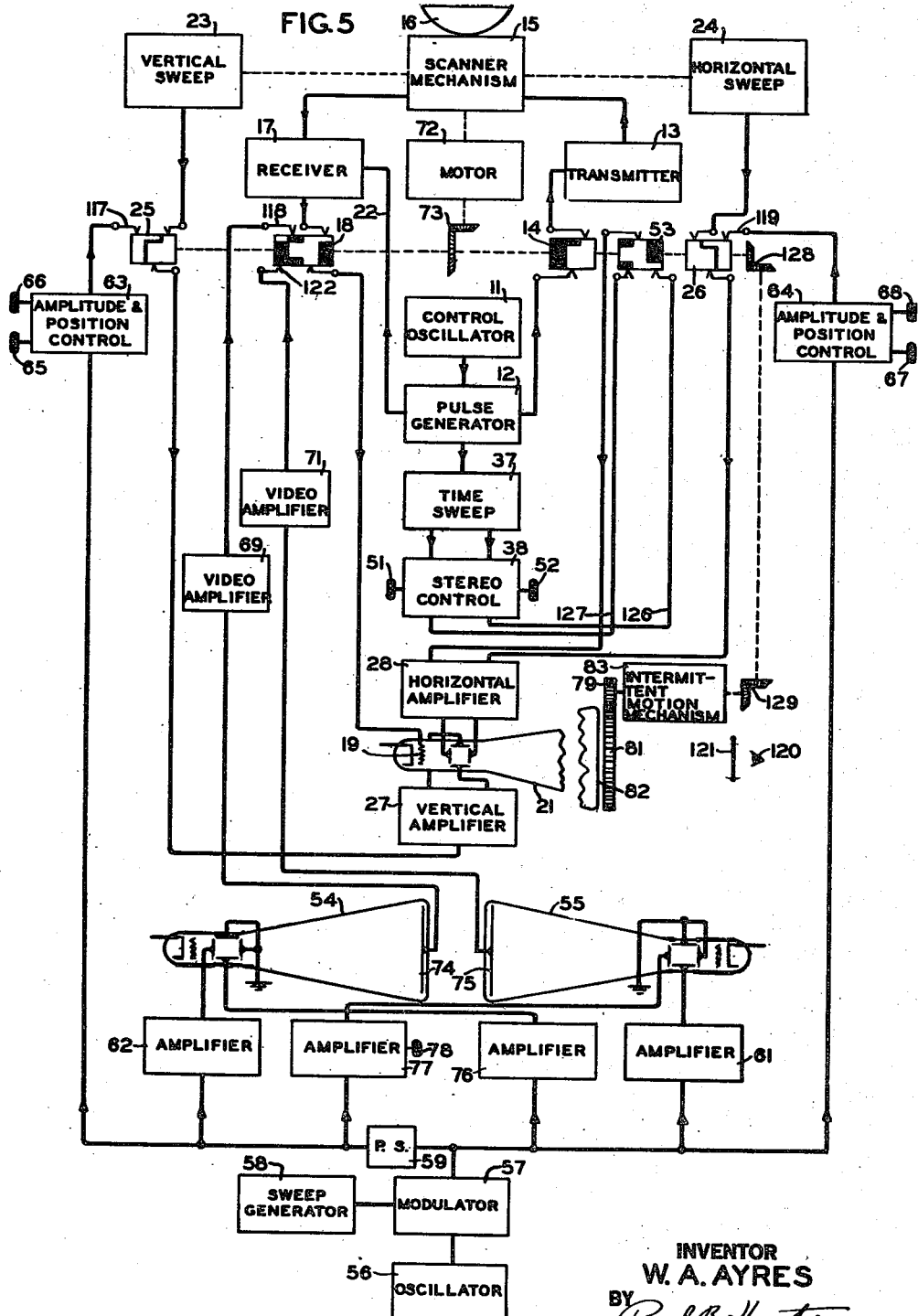
Fig. 5 is a block diagram of a simplified microwave object detecting and locating system employing an embodiment of the present invention.

The theory underlying the present invention may be more readily understood by reference to Figs. 1 and 2. In Fig. 1 objects symbolized by dots 1, 2, and 3 lie at distances increasing in numerical order from a viewpoint 4. For clarity and simplicity in illustration, all the objects are assumed to be on the same line of sight 5. This line is broken at 6 to show that object 3 lies at an extremely great distance. Now assume a surface 7 at some distance from the viewpoint 4. The points at which the lines of sight to objects pierce the surface 7 may be termed the goniometric positions of images of objects as represented on surface 7. The goniometrically positioned images corresponding to objects 1, 2, and 3 are coincident at a point 8. It is seen that all objects having the same bearing from a singular viewpoint possess images whose goniometric positions superimpose irrespective of the distance to the corresponding objects.

Assume now that viewpoint 4 is replaced by imaginary left and right viewpoints 9 and 10, respectively, separated by an effective interocular distance. Left and right rays passing through the objects pierce the surface 7 to form dual images, 1', 2', and 3' for the left viewpoint 9, and 1", 2", and 3" for the right viewpoint 10. It is seen that images 1' and 1" corresponding to object 1 lying in front of the surface 7 are displaced from the goniometric position 8 to the right and left, respectively, while images 2' and 2" corresponding to object 2 lying beyond surface 7 suffer a reverse displacement from the goniometric position 8, being to the left and right, respectively. Images corresponding to objects lying on the surface would not be displaced from the goniometric position. Since object 3 is assumed extremely distant, left and right rays to this object are substantially parallel to sighting line 5, and images 3' and 3'', therefore, have substantially the same separation as points 9 and 10, that is, the effective interocular distance. The lateral displacement of images from their goniometric positions caused by the assumption of imaginary right and left viewpoints may be called stereoscopic displacement and evidently varies according to distance. Fig. 2 illustrates the general relationship between stereoscopic displacement of images and distance of the corresponding objects from the viewpoint 4.

A stereoscopic indication of objects 1, 2, and 3 may be achieved by providing an indicator screen having images thereon positioned similarly to those on surface 7 where images 1', 2', and 3' are visible only to the left eye of an observer while images 1'', 2'', and 3'' are perceived only by the observer's right eye. Images seen by the left eye are paired in the observer's brain with complementary images seen by the right eye, and the fusion results in a perception of depth relationships between the objects 1, 2, and 3.

The present inventor has disclosed in the above-mentioned copending application Serial No. 458,109, that such a stereoscopic indication may be produced synthetically by goniometrically positioning images according to the bearings of objects as located by a single scanning radiator, and stereoscopically displacing these images according to the distance to the respective objects. The present inventor further revealed that only one viewpoint is thus necessary if the distance to all objects is determinable.

The reflected-pulse type of microwave object detecting and locating system is particularly adapted to provide three-dimensional pictures of the area scanned because the distance to detected objects is proportional to the transit time between the transmission of a pulse and the reception of the pulse after reflection from the objects. A time sweep wave may readily be synchronized with the transmission of pulses to provide an instantaneous amplitude which is a function of distance. The scanning agent of an indicator such as the electron beam of a cathode ray tube may be deflected in proportion to this instantaneous amplitude with the result that the stereoscopic displacement of the luminous image varies with distance in accordance with the characteristics of the time sweep wave.

Figs. 3A and 3B illustrate the time sweep waves corresponding to the stereoscopic displacement curves of Fig. 2. These curves represent the realistic relationship between displacement and distance but may often be adequately approximated by an exponential or linear shape over the desired distance limits. Any other wave shape may be employed to suit the particular need. The amplitude of the time sweep wave determines the stereoscopic contrast between nearest and furthest images while the average value of direct component determines the apparent distance to the indicator surface. It is preferable that the time sweeps employed for the right and left eye indications be equal and opposite to avoid distortion of the apparent bearings of objects.

According to the present invention range scales or indices may be provided in such varied forms as numerals, pips, lines, circles, etc., superimposed on the stereoscopic indication of objects. Fig. 4 illustrates some of these possible reference markings as they might appear on a cathode ray tube screen. The left circle is the indication intended only for the left eye while the right circle is the indication intended only for the right eye. Some typical means for producing this general type of indication are now discussed.

Referring now to Fig. 5, one embodiment of the present invention is disclosed as employed in a reflected-pulse type of microwave system. In the system illustrated a control oscillator 11 of any well-known type provides a voltage of suitable synchronizing frequency which may be in the audio range. The output of oscillator 11 is connected to a pulse generator 12 which converts the substantially sinusoidal oscillations fed to it into pulses of any desired shape, magnitude, and duration, having a repetition rate equal to the frequency of oscillator 11. This device employs well-known clipping, differentiating, and other suitable wave shaping circuits in a conventional manner and consequently seems to require no further explanation.

Sharp trigger pulses are supplied to a pulse transmitter 13 through a commutator 14. These trigger pulses cause an ultra high frequency oscillator such as a magnetron to be biased on momentarily. Transmitter 13 is thus made to produce extremely short pulses of perhaps one micro-second duration. These pulses of carrier frequency are fed to a scanner mechanism 15.

The scanner 15 may be of the general type shown in copending application Serial No. 438,388, filed April 10, 1942, in the names of L. A. Maybarduk et al. although the invention is in no way limited to any particular mode of scanning. Such a scanning device is adapted to scan a predetermined solid angle up to and including a complete hemisphere by means of a spiral conical motion of a sharply directive radiant energy beam. This motion is provided by rapidly spinning a radiator indicated at 16 about one axis while slowly nodding the radiating system about a second axis perpendicular to and rotating with the first axis.

The transmitter pulses are emitted in a narrow club-shaped beam from the radiator 16, and the frequency of the control oscillator 11 is chosen sufficiently high to insure that all objects within the field of view are irradiated by at least one pulse during the scanning cycle. Radiator 16 serves also to receive energy reflected from objects during intervals between successive transmission periods and to supply the reflected energy to a receiver 17.

The receiver 17 and the transmitter 13 are electrically isolated by means of well known gas-filled resonators incorporated in the connections to the radiator 16. These resonators are responsive to the difference in power between transmitted and received pulses and provide an automatic switching action which not only prevents appreciable transfer of generated power directly to the receiver but also eliminates loss of received energy in the transmitter. Examples of these switching resonators have been disclosed by W. L. Barrow et al, in copending application Serial No. 466,530, entitled Ultra high frequency devices, and filed November 20, 1942.

The receiver 17 amplifies and detects the received pulses in the usual manner and applies them through a commutator 18 to a control grid 19 of a cathode ray indicator 21. To further insure that no transmitted pulses directly affect the receiver 17, blanking pulses may be furnished from the pulse generator 12 over a line 22 in order to bias the receiver to insensitivity for the duration of each transmitted pulse. The detected pulses on the grid 19 turn on the electron beam of the indicator 21 after a delay behind their respective transmitted pulses according to the time required for radiant energy to travel to the point of reflection and return. The reflected energy thus produces images on the face 82 of the indicator 21 which correspond to irradiated objects.

The images of detected objects are goniometrically position on indicator face 82 by means of a vertical sweep circuit 23 and a horizontal sweep circuit 24, mechanically connected to the scanner mechanism 15 and adapted to convert the scanning motion of the radiant beam into corresponding electron beam-deflecting potentials for the cathode ray indicator 21. Circuits 23 and 24 connect through commutators 25 and 26, respectively, to vertical and horizontal deflection amplifiers 27 and 28, respectively.

The amplifiers 27 and 28 may conveniently be of the type shown in Fig. 6 having a push-pull output and two single-ended inputs. Here two identical tubes 29 and 31 have in common a high resistance cathode load 32 maintained at a large negative potential. A signal applied to either grid 33 or 34 appears across plate resistors 35 and 36 with opposite polarity and substantially equal magnitude. Cathode ray deflecting electrodes directly coupled to leads 30 and 40 displace the electron beam according to the sum of the impressed voltages whether alternating or direct. The operating potential on the tubes 29 and 31 being the same on each deflecting electrode causes no beam deflection.

The images of detected objects are stereoscopically displaced from their goniometric positions on the indicator face 82 by the employment of a time sweep circuit 37 and associated stereo control circuit 38 acting through a commutator 53 to supply the horizontal deflection amplifier 28 with stereoscopic displacement waves. The pulse generator 12 triggers the time sweep circuit 37 coincident with the transmission of radiant pulses from radiator 16. The instantaneous amplitude of the sweep voltage may be any desired function of time such as a substantially hyperbolic, exponential, or linear wave according to the desired stereoscopic displacement wave. Since sweep circuits are well known, no detailed discussion is necessary. The output wave of the sweep circuit 37 is fed in push-pull to the stereo control circuit 38 which may comprise two cathode-follower stages each similar to the one illustrated in Fig. 7.

The cathode-follower stage shown in Fig. 7 comprises a tube 39 attached to a cathode load consisting of a voltage divider 41 in series with a high fixed resistor 42, the combination being connected to a source several hundred volts negative with respect to ground. The midpoint of the voltage divider 41 is approximately at ground potential. An adjustable tap 47 is electrically connected to an output lead 48 and mechanically adjusted by a direct voltage level control knob 49. A voltage divider 43 is connected between an input lead 45 and ground. An adjustable tap 44 connects to the control grid of tube 39 and provides a means of amplitude control through mechanically attached knob 46.

The stereo control 38 is provided with a knob 75 to allow simultaneous adjustment of the amplitudes of the stereoscopic displacement waves passing through its two cathode-follower stages. Control circuit 38 is further provided with a knob 52 to facilitate alteration of the direct voltage level of these waves by preferably equal and opposite amounts. One stage of the circuit 38 has an output lead 126 upon which its stereoscopic displacement wave is impressed, while the parallel stage of the circuit 38 has an output lead 127 to which the substantially mirror image of the above wave is supplied. Leads 126 and 127 are alternately connected through the commutator 53 to the second input of the horizontal deflection amplifier 28 in whose output the stereoscopic displacement waves are algebraically added to the goniometric potential from sweep circuit 24.

Images therefore appear on the indicator face 82 suitably placed for either right or left eye indication according to whether lead 126 or 127 supplies the stereoscopic displacement wave. These indications are repeated at a rate sufficiently high to avoid flicker, and viewing means are provided to enable an observer at a viewpoint 120 to see these indications as a unified three-dimensional picture.

The following viewing means may be employed to permit the right and left eyes of the observer to see only the indications intended for the respective eyes, the left eye indication being obscured from the right eye and vice versa. A motor 72 drives the scanner mechanism 15 and rotates commutators 25, 18, 14, 53, and 26 through gearing 73. An intermittent motion mechanism 83 such as a Geneva movement, is driven synchronously with the commutators by means of gearing 128 and 129. The mechanism 83 has a driving pinion 79 which engages a ring gear 81 supported parallel and concentric with the indicator face 82 by suitable bearings (not shown). The ring gear 81 provides a supporting frame for a polarizing screen held before the face 82. This screen may be made of a commercially available transparent sheet adapted to plane polarize the light it transmits. The oscilloscopic picture as viewed through this screen is therefore optically polarized in a plane corresponding to the angle of rotation of this screen about the line of sight.

The intermittent motion mechanism 83 is adapted to rotate or oscillate this screen by means of the gearing 79, 81 in 90° progression after each quarter revolution of the commutators. The plane of polarization may, for example, be vertical and horizontal, successively, for the major portion of the time and may pass through intermediate angles very rapidly. If the face 82 is observed from viewpoint 120 through polarizing eye glasses, indicated at 121, the right and left lens transmitting only vertical and horizontal polarizing light, respectively, the observer's right and left eyes respond only to those indications intended for these eyes. The dual images corresponding to each object are fused in the brain of the observer and provide a three-dimensional picture. It is to be understood that other viewing means, such as those shown in above-mentioned copending application Serial No. 458,109, may be alternatively employed.

In the embodiment of Fig. 5, the range indices exist as patterns formed on targets 74 and 75 in picture source cathode ray tubes 54 and 55, respectively. These patterns are analyzed in terms of video signals and scanning potentials and are then reproduced on the indicator face 82. Range indices may also exist as a pattern formed in a single picture source tube or may be generated without aid of such tubes as more specifically disclosed and claimed in copending patent application Serial No. 478,583 titled Synthesized stereoscopic range indication filed March 9, 1943, in the name of E. C. Streeter, Jr. For the present purposes the following means are provided.

An oscillator 56 supplies a carrier wave to modulator 57 where this wave is modulated by the saw-tooth or pyramidal audio output of a sweep generator 58. The linearly-modulated carrier wave is supplied to amplifiers 61 and 76 and to an amplitude and position control 64 utilizing a circuit of the same general type as illustrated in Fig. 7. Knobs 67 and 68 may be supplied for horizontal amplitude and up-down position adjustment, respectively. The output of modulator 57 is also supplied through a 90° phase shifter 59 to amplifiers 62 and 77 and to an amplitude and position control 63 similar to device 64 and having vertical amplitude and right-left position adjustment knobs 65 and 66, respectively.

Amplifiers 62 and 76 are connected to vertical and horizontal deflection plates, respectively, in the picture source cathode ray tube 54 while amplifiers 77 and 61 are connected to corresponding deflection plates in the tube 55 similar to device 54. The quadrature phase relationship between the deflection potentials causes the electron beams in tubes 54 and 55 to scan metal targets 74 and 75, respectively, with a substantially spiral motion. It is to be understood that the use of spiral scanning is merely illustrative and that rectangular or other types of scanning may be employed with equal fitness. The targets 74 and 75 are preferably made of metal having a high secondary emission ratio such as aluminum foil with a natural oxide coating. The desired left and right range patterns may be printed on the surface of targets 74 and 75, respectively, in carbon ink or other material having a secondary emission ratio appreciably different from the natural oxide.

As the targets 74 and 75 are scanned, variations in the secondary emission current from the range patterns produce video signals corresponding to the indices to be reproduced. Since the difference in magnitudes of secondary emission determines the video current, it is possible to develop a greater signal than would be provided by the use of the primary current of the electron beams alone. The signal outputs of tubes 54 and 55 are supplied to video amplifiers 69 and 71, respectively. The signals amplified by the devices 69 and 71 are fed to contacts 118 and 122 of grid commutator 18. The outputs of control circuits 63 and 64 supply the vertical and horizontal components, respectively, of the sweep produced by circuits 56, 57, 58, and 59 to the contacts 117 and 119 of vertical and horizontal sweep commutators 25 and 26, respectively.

The commutators 18, 25, and 26 permit the placement of the range indices, as thus analyzed in terms of video signals and scanning potentials, upon the indicator face 82. The commutators are represented as having insulating portions in black and conducting segments in white. The commutators supply right and left eye indications of objects and right and left eye indications of range indices in repeated sequence to the indicator 21. Each indication occupies substantially a quarter revolution of the commutators. The commutators have a gearing ratio with respect to the scanner mechanism 15 such that this switching action occurs at the end of each scanning period of the radiator 16. During range indication, vertical and horizontal sweep circuits 23 and 24, respectively, stereo control circuit 38 and receiver 17 are disconnected from the indicator 21 while transmitter 13 is deprived of trigger pulses from generator 12. The momentary position of the commutators illustrated in Fig. 5 corresponds to about mid-period of the right eye indication of objects.

The placement of the range patterns on the face 82 of the indicator 21 may be adjusted as desired by up-down and right-left control knobs 66 and 68. The size of the range indices may be adjusted by vertical and horizontal amplitude controls 65 and 67, respectively, while the usual position adjustment in horizontal deflection amplifier 77 is connected to a knob 78 to provide for variation of the apparent plane of the indicator face 82 during periods of range reproduction. Alteration of the horizontal size of the range indices naturally causes a change in the lateral spacing between right and left pairs of images. This is equivalent to an alteration in the stereoscopic contrast of the range indices. Amplitude and positioning knobs 51 and 52 of the stereo control 38 are suitably adjusted so that the stereoscopic contrast and the apparent plane of the indicator face 82 are the same during the periods of object indication as during the periods of range indication.

Since there is wide variation in the types of mechanical and electronic scanning encountered in object locator systems and in the particular range indication requirements of these systems, many changes or rearrangements could be made in the above construction to suit specific needs and many apparently widely different embodiments of this invention could be made without departing from the scope thereof, it being intended that all matter contained in the above description or shown in the accompanying drawings shall be interpreted as illustrative and not in a limiting sense.

What is claimed is:

1. A radio receiving system comprising a receiver of periodic pulse signals, cathode ray indicating means provided with a viewing screen, means for forming dual images from said pulse signals laterally separated on said viewing screen according to a periodic function of time, means for generating stereoscopic reference signals, means for forming dual indices from said reference signals laterally separated on said viewing screen, and stereoscopic viewing means for observing the apparent depth relationship between said images and said indices.

2. In a radio locator system wherein goniometrically located dual images are formed on a viewing screen in response to reflections from irradiated objects, said images being separated as a function of range to provide stereoscopic effects, the combination comprising means for scanning targets with electron beams, means for generating video signals through differential reaction of portions of said targets to said beams, means for varying the intensity of a reproducing beam in accordance with said video signals, means for deflecting said reproducing beam in accordance with said scanning, and means for modifying said deflection to produce stereoscopic effects.

3. In a radio locator system wherein goniometrically located dual images are formed on a viewing screen in response to reflections from irradiated objects, said images being separated as a function of range to provide stereoscopic effects, the combination comprising electron beam tubes, a target in each of said tubes having a surface for receiving the electron beam, portions of said surface being provided with distance indices receptive to said beam differently from the remainder of said surface, means generating sweep waves for deflecting said beams over said targets, means for amplifying video signals resulting from the different receptivity of said surface portions, and means responsive to said signals for reproducing said distance indices on said viewing screen spaced in accordance with said sweep waves.

4. Radio object detecting apparatus comprising transmitting means for irradiating an object periodically with electromagnetic energy pulses, receiving means for deriving signals from a portion of said energy pulses reflected from said object, indicator means for forming dual images from said signals, means for stereoscopically separating said dual images as a function of distance to said object, electron beam tubes, a target in each of said tubes having a surface for receiving the electron beam, portions of said surface being provided with distance indices receptive to said beam differently from the remainder of said surface, means generating sweep waves for deflecting said beams over said targets, means amplifying video signals resulting from the different receptivity of said surface portions, and means responsive to said signals for reproducing said distance indices on said indicator means spaced in accordance with said sweep waves.

5. In a radio locator system providing a three-dimensional representation of a scanned area, the combination comprising cathode ray indicating means provided with a viewing screen electron beam tubes, a target in each of said tubes having a surface for receiving the electron beam, portions of said surface being provided with distance indices receptive to said beam differently from the remainder of said surface, means generating sweep waves for deflecting said beams over said targets, means for amplifying video signals resulting from the different receptivity of said surface portions, means responsive to said signals for reproducing said distance indices on said viewing screen spaced in accordance with said sweep waves, and control means for altering the separation of said indices on said screen.

6. In a radio locator system providing a three-dimensional representation of a scanned area, the combination comprising cathode ray indicating means provided with a viewing screen, electron beam tubes, a target in each of said tubes having a surface for receiving the electron beam, portions of said surface being provided with distance indices receptive to said beam differently from the remainder of said surface, means generating sweep waves for deflecting said beams over said targets, means for amplifying video signals resulting from the different receptivity of said surface portions, means responsive to said signals for reproducing said distance indices on said viewing screen spaced in accordance with said sweep waves, and a variable gain control for altering the magnitude of said indices on said screen relative to said three-dimensional representation.

7. In a radio locator system providing a three-dimensional representation of a scanned area, the combination comprising cathode ray indicating means provided with a viewing screen, electron beam tubes, a target in each of said tubes having a surface for receiving the electron beam, portions of said surface being provided with distance indices receptive to said beam differently from the remainder of said surface, means generating sweep waves for deflecting said beams over said targets, means for amplifying video signals resulting from the different receptivity of said surface portions, means responsive to said signals for reproducing said distance indices on said viewing screen spaced in accordance with said sweep waves, and positional control means for adjusting the position of said indices on said screen relative to said three-dimensional representation.

8. Stereoscopic apparatus comprising a source of periodic pulse signals, cathode ray indicating means providing a field of view and supplied by said source for forming dual images from said pulse signals, means producing a time sweep having the same periodicity as said pulse signals for laterally separating respective portions of said images in said field of view according to a periodic function of time, means for generating reference signals, means for forming stereoscopically separated dual indices in said field of view in response to said reference signals, and stereoscopic viewing means for observing the apparent depth relationship between said images and said indices.

9. A radio receiving system comprising a receiver of periodic signals, cathode ray indicating means providing a field of view and supplied by said source for forming dual images from said pulse signals, means producing a time sweep having the same periodicity as said pulse signals for laterally separating respective portions of said images in said field of view according to a periodic function of time, means for generating reference signals, means for forming stereoscopically separated dual indices in said field of view in response to said reference signals, and stereoscopic viewing means for observing the apparent depth relationship between said images and said indices.

WALDEMAR A. AYRES.

REFERENCES CITED

The following references are of record in the file of this patent:

UNITED STATES PATENTS

| Number | Name | Date |
| --- | --- | --- |
| 2,121,359 | Luck et al. | June 21, 1938 |